United States Patent [19]

Crossman

[11] Patent Number: 4,500,549

[45] Date of Patent: Feb. 19, 1985

[54] USE OF WHEY-DERIVED PRODUCTS AS CHEESE FLAVORING AGENTS OR ENHANCERS

[75] Inventor: Tommy L. Crossman, Corning, N.Y.

[73] Assignee: Corning Glass Works, Corning, N.Y.

[21] Appl. No.: 472,735

[22] Filed: Mar. 7, 1983

[51] Int. Cl.$^3$ ............................................. A23C 21/02
[52] U.S. Cl. ...................................... 426/33; 426/35; 426/41; 426/533; 426/650; 426/583
[58] Field of Search .................. 426/33, 35, 41, 533, 426/650, 583

[56] References Cited

U.S. PATENT DOCUMENTS

| | | | |
|---|---|---|---|
| 2,531,329 | 11/1950 | Farnham | 195/63 |
| 3,780,182 | 12/1973 | Johnson | 426/33 |
| 3,840,672 | 10/1974 | Kasik et al. | 426/533 |
| 3,975,544 | 8/1976 | Kosikowski | 426/35 |
| 3,998,700 | 12/1976 | Reinbold | 426/41 |
| 4,016,293 | 4/1977 | Coughlin et al. | 426/42 |
| 4,133,895 | 1/1979 | Kosikowski et al. | 426/33 |
| 4,158,607 | 6/1979 | Kalinowski et al. | 195/62 |
| 4,172,900 | 10/1979 | Dooley | 426/38 |
| 4,310,554 | 1/1982 | Olson et al. | 426/40 |
| 4,358,464 | 11/1982 | Soehnlen | 426/41 |
| 4,379,170 | 4/1983 | Hettinga | 426/35 |

OTHER PUBLICATIONS

Weetall, H. H., Havewala, N. B., Pitcher, W. H., Jr., Detar, C. C., Vann, W. P. and Yaverbaum, S., *Biotechnology and Bioengineering*, vol. XVI, pp. 295-313, 689-696 (1974).

Wierzbicki, L. E., Edwards, V. H. and Kosikowski, F. V., *Biotechnology and Bioengineering*, vol. XVI, pp. 397-411 (1974).

*Primary Examiner*—Jeanette Hunter
*Attorney, Agent, or Firm*—B. D. Voyce

[57] ABSTRACT

Cheese flavoring agents and cheese flavor enhancers are provided in the form of enzyme-modified, lactose-hydrolyzed whey or whey fractions. The products have a flavor profile characteristic of aged cheese and a flavor intensity sufficient to serve as the sole source of cheese flavor or as a cheese flavor enhancer in a variety of food products.

17 Claims, No Drawings

USE OF WHEY-DERIVED PRODUCTS AS CHEESE FLAVORING AGENTS OR ENHANCERS

BACKGROUND OF THE INVENTION

This invention relates to the use of whey-derived products as cheese flavoring agents or cheese flavor enhancers in food formulations. More particularly, the invention relates to the use of enzyme-modified, lactose-hydrolyzed whey or whey fractions as such flavoring agents or enhancers.

Cheese flavoring is used in a variety of products including, by way of example only, crackers, breads, salad dressings, cheese spreads, sauces and snack foods. In general, the cheese flavor in these products comes from the inclusion of a natural cheese flavor extract, an artificial cheese flavor or in some cases, natural cheese. Natural cheese and cheese flavors are expensive. Indeed, natural cheese is so expensive that it is used in only limited quantities, if at all, in most products.

In accordance with the present invention, it has been found that high quality, natural and inexpensive cheese flavoring can be provided by suitably modifying whey, the by-product of cheese manufacturing. In particular, it has been found that whey, which has had some of its lactose hydrolyzed and which has been subjected to enzyme modification by lipase and/or protease enzymes, is an effective source of cheese flavor for food products. Whey treated in this manner has been found to have a flavor profile similar to that of aged cheese. Moreover, when combined with natural cheese, natural cheese flavor extracts or artificial cheese flavors, the enzyme-modified, lactose-hydrolyzed whey products have been found to serve as an enhancer of the overall cheese flavor of the product.

Whey, the source material for the cheese flavoring agents or enhancers of the present invention, is in abundant supply. On a world-wide basis, the production of whey each year is estimated to be over 50 billion pounds. Whey typically contains, per liter, approximately 6 to 9 grams of protein, 45 to 50 grams of lactose, 6 to 8 grams of mineral salts, and 1 to 2 grams of fat. In view of this composition and its abundant supply, whey represents a potentially important natural source of food for human consumption, provided it can be modified from its original state so as to make it palatable and functional in combination with other food ingredients.

Unfortunately, whey, as it is produced during the cheese manufacturing process, is of limited value for use in commercial food products. Indeed, in the past, whey was regarded as a waste product and was discharged into sewers or streams and rivers. Today, because of increased concerns over environmental pollution, much of the whey which is produced is subjected to some processing so that at a minimum it can be used as animal feed. Using whey as animal feed, however, is a low value application and does not effectively take advantage of the true food value of whey.

Accordingly, the present invention, by providing a way to utilize whey as a cheese flavoring agent or enhancer, provides a practical means to use the food value of whey, and at the same time, in view of the low cost of whey, to reduce the cost of cheese flavoring products.

SUMMARY OF THE INVENTION

It is the object of this invention to provide cheese flavoring agents and enhancers by suitably modifying whey or whey fractions.

In accordance with the invention, it has been found that when whey or a whey fraction is subjected to both lactose hydrolysis and enzyme-modification, a product is produced which is an effective cheese flavoring agent. Moreover, it has been found that when enzyme-modified, lactose-hydrolyzed whey or a whey fraction is used in combination with another source of cheese flavor, such as natural cheese or a natural cheese flavor extract, the acceptability of the product is greater than what would be expected from the sum due to the contribution of the cheese flavors of the whey-based material and the other source of cheese flavors.

In accordance with one aspect of the invention, a cheese flavoring agent is provided which comprises whey or a whey fraction which has been lactose hydrolyzed and enzyme modified with lipase, protease or a combination of lipase and protease enzymes to produce a flavor profile characteristic of aged cheese and a flavor intensity sufficient to provide cheese flavor in food formulations, which whey or whey fraction, before lactose hydrolysis and enzyme modification, had a protein content of from about 2 to about 90 percent on a dry weight basis and a lactose content of from about 5 to about 85 percent on a dry weight basis, which lactose is at least about 30 percent hydrolyzed.

In accordance with another aspect of the invention, a cheese flavor enhancer is provided which comprises whey or a whey fraction which has been lactose hydrolyzed and enyzme modified with lipase, protease or a combination of lipase and protease enzymes to produce a flavor profile characteristic of aged cheese and a flavor intensity sufficient, in combination with other cheese flavoring agents, to provide cheese flavor in food formulations, which whey or whey fraction, before lactose hydrolysis and enzyme modification, had a protein content of from about 2 to about 90 percent on a dry weight basis and a lactose content of from about 5 to about 85 percent on a dry weight basis, which lactose is at least about 30 percent hydrolyzed.

In accordance with an additional aspect of the invention, a method for producing a whey-based cheese flavoring agent or cheese flavor enhancer is provided which comprises the following steps which can be performed sequentially, in any order, or simultaneously:

(a) enzymatically modifying whey or a whey fraction with lipase, protease or a combination of lipase and protease enzymes to produce a flavor profile characteristic of aged cheese and a flavor intensity sufficient to provide cheese flavor in food formulations; and (b) hydrolyzing at least about 30 percent of the lactose component of the whey or whey fraction, the whey or whey fraction having had, before enzyme modification and lactose hydrolysis, a protein content of from about 2 to about 90 percent on a dry weight basis and a lactose content of from about 5 to about 85 percent on a dry weight basis.

In certain preferred embodiments, the protein content of the whey or whey fraction, prior to enzyme modification, was from about 8 to about 60 percent on a dry weight basis, and the lactose content, before hydrolysis, was from about 20 to about 85 percent on a dry weight basis, and the lactose is at least about 40 percent hydrolyzed. In other preferred embodiments, the lactose is at least about 70 percent hydrolyzed.

As used herein, the term "whey" means whey as obtained from a cheese manufacturing process, i.e., whole whey. The term "whey fraction" applies to whey which has had one or more constituents either wholly or partially removed. Examples of the more common whey fractions include, by way of illustration only, whey permeate, which is whey from which a substantial amount of protein has been removed, typically by ultrafiltration; demineralized whey, which is whey from which part or all of the mineral (inorganic) salts have been removed; and whey protein concentrate, which is the protein-enriched fraction obtained by ultrafiltration (whey permeate, of course is the other fraction).

In general, hydrolysis of the whey or whey fraction can be accomplished by any known means. Thus, hydrolysis can be carried out by chemical methods or enzymatic methods which, in the latter case, can utilize either soluble or immobilized enzymes. Enzymatic hydrolysis is preferred, and the use of immobilized enzymes is most preferred.

DESCRIPTION OF THE PREFERRED EMBODIMENTS

As discussed above, the present invention provides a new cheese flavoring agent or cheese flavor enhancer derived from whey.

The composition and method of preparation of cheese flavored food products are well known to persons having ordinary skill in the art. By way of illustration only, specific recipes and methods of preparation are described below for representative cheese crackers, cheese bread, cheese flavored pizza sauce, cheese flavored Italian sauce, cheese spread and blue cheese salad dressing products. The ingredients, quantities and methods of preparation used in these examples are not critical and other recipes and procedures can be used and will be readily apparent to those of ordinary skill in the art.

In accordance with the most preferred embodiment of the invention, the hydrolysis of the whey or whey fraction is performed by means of immobilized enzymes. Hydrolysis by this approach is well known to those having ordinary skill in the art. By way of illustration only, H. H. Weetall et al., *Biotechnol. Bioeng.*, 16, 295 (1974), reports the preparation of immobilized lactase and its use in the enzymatic hydrolysis of acid whey. The enzyme, isolated from both fungi and yeast, was immobilized on zirconia-coated porous glass particles. The substrate consisted of either an aqueous lactose solution or acid whey permeate.

Additionally, L. E. Wierzbicki et al., *Biotechnol. Bioeng.*, 16, 397 (1974), discusses the hydrolysis of lactose in acid whey using lactase immobilized on porous glass particles with emphasis on the preparation and characterization of a reusable catalyst for the production of low-lactose dairy products. Partially purified lactases from *Aspergillus niger, Lactobacillus helveticus,* and *Saccharomyces lactis* were immobilized on porous glass particles. The substrate consisted of acid whey powder which had been reconstituted in water to the appropriate solids concentration. In some instances, the reconstituted acid whey was deproteinized by heating in a boiling water bath for five minutes.

Moreover, H. H. Weetall et al., *Biotechnol. Bioeng.*, 16, 689 (1974), describes the preparation of immobilized lactase as part of continued studies on the enzymatic hydrolysis of lactose. A fungal lactose was employed, immobilized on zirconia-coated controlled-pore glass and porous titania particles. The resulting immobilized enzyme preparations were used for the hydrolysis of lactose in whole sweet whey, whole acid whey, acid whey ultrafiltrate (permeate), and pure lactose.

An especially useful process for hydrolyzing lactose is disclosed in copending and commonly assigned application Ser. No. 269,945 filed July 3, 1981 now U.S. Pat. No. 4,409,241 in the names of Jean-Luc A. Guy Baret and Luc A. Dohan. The process involves heating the whey to a temperature of from about 45° to about 90° C. for at least about 15 seconds, centrifuging the heated whey while it is still warm, and contacting the centrifuged whey with an immobilized lactase under conditions sufficient to hydrolyze at least a portion of the lactose contained therein into glucose and galactose.

The enzyme modification of the whey or whey fraction is performed with lipase and/or protease enzymes known in the art. In general terms, the whey or whey fraction is reacted with the lipase and/or protease enzymes for a time sufficient for these enzymes to develop a cheese flavor profile characteristic of aged cheese in the whey or whey fraction and a cheese flavor intensity sufficient to provide cheese flavor in, or enhance the cheese flavor of, food formulations. The whey or whey fraction can be reacted with the lipase and/or protease enzymes either before, after or simultaneously with lactose hydrolysis. The lipase and/or protease enzymes can be in the form of soluble enzymes or immobilized enzymes. In the case of soluble enzymes, the enzymes can be deactivated prior to the incorporation of the flavoring agent or enhancer in the food product or can be left active so that further cheese flavor will develop in the finished product.

With regard to the composition of the cheese flavoring agents or cheese flavor enhancers, their protein content, prior to enzyme modification, is generally between from about 2 to about 90 percent on a dry weight basis and their lactose content, before hydrolysis, is generally from about 5 to about 85 percent on a dry weight basis. The protein content preferably is from about 8 to about 60 percent on a dry weight basis. Preferably, the lactose content, before hydrolysis, is from about 20 to about 85 percent on a dry weight basis. The lactose is at least 30 percent hydrolyzed and preferably, at least about 40 percent hydrolyzed; more preferably, at least about 70 percent of the lactose is hydrolyzed.

In an especially preferred embodiment, the protein content of the cheese flavoring agent or cheese flavor enhancer, before enzyme modification, is from about 8 to about 60 percent on a dry weight basis and the lactose content, before hydrolysis, is from about 20 to about 85 percent on a dry weight basis, which lactose is at least about 40 percent hydrolyzed. Most preferably, such lactose is at least about 70 percent hydrolyzed.

Without intending to limit it in any manner, the present invention will be more fully described by the following examples which compare the cheese flavoring agents of the invention with prior art cheese flavoring agents and which illustrate certain preferred embodiments of the invention. In particular, comparison tests are presented employing the cheese flavoring agents of the invention, natural cheese and natural cheese flavor extracts. Also, the enhancement in cheese flavor produced by the products of the invention is demonstrated.

Cheese crackers, cheese bread, cheese flavored pizza sauce, cheese flavored Italian sauce, cheese spread and blue cheese salad dressing products are included in the examples. These products were taste tested by expert panels for cheese flavor and overall flavor. As discussed in detail below, the whey-based cheese flavoring ingredients of this invention quite unexpectedly were found to produce a cheese flavor at least as good as the natural cheese and natural cheese flavor extracts. Moreover, when the whey-based product was used in combination with another source of cheese flavor, the resulting product had an enhanced overall acceptability rating greater than what would have been expected from that attributable to the separate sources of cheese flavor.

The enzyme-modified, lactose-hydrolyzed whey used in the examples was prepared from sweet whole whey which was acidified to a pH between 4.7 and 4.8 and then 90 percent lactose hydrolyzed. The resulting mixture was concentrated to 60–65 percent total solids and refrigerated at 4°–8° C. Its composition was approximately:

| Ingredient | Weight percent |
|---|---|
| Protein | 6.5–8.0% |
| Lactose | 3–5% |
| Glucose | 16–21% |
| Galactose | 16–21% |
| Ash | 4–6% |
| Fat | 0.5–1% |
| Moisture | 35–40% |

The lactose-hydrolyzed whey concentrate thus obtained was enzyme-modified using calf lipase, kid-lamb lipase and fungal protease enzymes. The specific enzymes employed were Miles Lipase No. 600 (calf lipase), Miles Lipase No. 400 (kid-lamb lipase) and Miles Fungal Protease (60,000 count activity), obtained from Miles Laboratories, Elkhart, Ind. Each enzyme was used at a concentration of 0.25 percent by weight of the total weight of the lactose-hydrolyzed whey concentrate.

Prior to introduction of the enzymes to the concentrate, the concentrate was brought out of refrigeration and held at a temperature of 18°–20° C. for 24 hours. The enzymes were added to the concentrate by first blending the enzymes with about 25 percent of the total amount of concentrate, using a high speed blender or mixer (Waring-type). This mixture was then combined with the rest of the concentrate and thoroughly mixed to a completely disperse the enzymes.

The mixture was incubated for 72 hours at a temperature of 18°–20° C. until a suitable flavor level had developed. Thereafter, the product was refrigerated at a temperature of 2°–5° C. for about a week, during which time a more subtle, well rounded cheese flavor developed in the product. Alternatively, the product could have been used immediately after the 72 hour incubation period, without further processing. Also, a shorter incubation period, for example on the order of 48 hours, or a longer incubation period, and either higher or lower incubation temperatures could have been used. In general, the choice of incubation times and temperatures will depend upon the particular enzymes used and the characteristics of the whey being enzyme modified. The determination of these parameters is well within the ordinary skill in the art and persons having such skill will have no difficulty in determining when a suitable cheese flavor profile and intensity have been achieved.

Using the enzyme-modified, lactose-hydrolyzed whey concentrate described above, cheese crackers, cheese bread, cheese flavored pizza sauce, cheese flavored Italian sauce, cheese spread and blue cheese salad dressing were prepared in accordance with the Examples 1–6. The percentages given in these examples are by weight. So that the solid contents for the products would be the same, sweet whey powder and additional water were included in the formulations using natural cheese flavor extracts.

The products were evaluated for cheese flavor and overall flavor by an expert taste panel. The results of the evaluations are given in Example 7.

EXAMPLE 1

Cheese crackers were prepared using a natural cheddar cheese flavor extract (Edlong Natural Cheddar Cheese Flavor No. 1032) and the enzyme-modified, lactose-hydrolyzed whole whey flavoring agent, described above. The compositions of the cheese cracker products are given in Table I.

TABLE I

| | CHEESE CRACKERS | |
|---|---|---|
| Ingredient | Enzyme-Modified Lactose-Hydrolyzed Whole Whey | Natural Cheese Flavor Extract |
| Flour | 60.04% | 60.04% |
| Water | 16.99% | 23.70% |
| Shortening | 4.50% | 4.50% |
| Malt Syrup | 0.60% | 0.60% |
| Salt | 0.60% | 0.60% |
| Sodium Bicarbonate | 0.27% | 0.27% |
| Yeast | 0.18% | 0.18% |
| Sweet Whey Powder | — | 8.40% |
| Edlong Natural Cheddar Cheese Flavor No. 1032 | — | 1.68% |
| Enzyme-Modified, Lactose-Hydrolyzed Whole Whey (60% solids) | 16.82% | — |

The crackers were prepared by the standard sponge dough process. Approximately two-thirds of the flour, three-fourths of the cheese flavoring agent, most of the water and all of the yeast and shortening were combined and fermented at room temperature for 18 hours. The remainder of the flour, water, cheese flavoring agent and all of the sodium bicarbonate, malt syrup, and salt were then added to the fermented mixture, after which fermentation was continued at room temperature for an additional 5 to 5½ hours. The dough was then rolled out to form a thin sheet, cut into round cracker shapes, pricked with a fork and placed on a greased cooking sheet. The cheese crackers were baked at 415° F. for five to ten minutes until browned.

EXAMPLE 2

Two batches of cheese bread were prepared using natural cheddar cheese and the enzyme-modified, lactose-hydrolyzed whole whey flavoring agent, described above. The formulations for the products are given in Table II.

TABLE II

| | CHEESE BREAD | |
|---|---|---|
| Ingredient | Enzyme-Modified Lactose-Hydrolyzed Whole Whey | Natural Cheese |
| Flour | 46.13% | 49.36% |
| Milk, whole | 21.91% | 23.54% |
| Water | 6.46% | 6.94% |

TABLE II-continued
CHEESE BREAD

| Ingredient | Enzyme-Modified Lactose-Hydrolyzed Whole Whey | Natural Cheese |
|---|---|---|
| Sugar | 4.04% | 4.34% |
| Butter | 3.46% | 3.72% |
| Egg | 2.53% | 2.72% |
| Salt | 0.82% | 0.88% |
| Yeast | 0.81% | 0.87% |
| Cheddar Cheese | — | 7.43% |
| Enzyme-Modified, Lactose-Hydrolyzed Whole Whey (60% Solids) | 13.84% | — |

The cheese bread products were prepared in a standard way by scalding the milk, warming the water, dissolving the yeast therein, and then adding the scalded milk, sugar, butter, salt and dissolved yeast together. To this mixture were added the eggs and cheese flavoring agent. The ingredients were mixed well together, after which the flour was added and beaten in until all the ingredients were well incorporated in the dough. The dough was kneaded, shaped into loaves and allowed to rise until it doubled in size. The loaves were then baked at 375° F. for 30 minutes.

EXAMPLE 3

Two batches of cheese flavored pizza sauce were prepared using a natural parmesan cheese flavor extract (Edlong Natural Parmesan Cheese Flavor No. 1085) and the enzyme-modified, lactose-hydrolyzed whole whey flavoring agent, described above. The formulations for the sauces are given in Table III. This product was prepared by heating all of the ingredients together until dissolved.

TABLE III
CHEESE FLAVORED PIZZA SAUCE

| Ingredient | Enzyme-Modified Lactose-Hydrolyzed Whole whey | Natural Cheese Flavor Extract |
|---|---|---|
| Water | 47.35% | 51.05% |
| Tomato Paste | 40.80% | 40.80% |
| Corn Oil | 1.10% | 1.10% |
| Oregano | 0.35% | 0.35% |
| Basil | 0.30% | 0.30% |
| Garlic Powder | 0.10% | 0.10% |
| Sweet Whey Powder | — | 6.0% |
| Edlong Natural Parmesan Cheese Flavor No. 1085 | — | 0.3% |
| Enzyme-Modified, Lactose-Hydrolyzed Whole Whey (60% Solids) | 10.00% | — |

EXAMPLE 4

Two batches of cheese flavored Italian sauce were prepared using a natural parmesan cheese flavor extract (Edlong Natural Parmesan Cheese Flavor No. 1085) and the enzyme-modified, lactose-hydrolyzed whole whey flavoring agent, described above. The formulations for the sauces are given in Table IV. As with the pizza sauces, these products were prepared by heating the various ingredients until they were completely dissolved.

TABLE IV
CHEESE FLAVORED ITALIAN SAUCE

| Ingredient | Enzyme-Modified Lactose-Hydrolyzed Whole Whey | Natural Cheese Flavor Extract |
|---|---|---|
| Tomatoes | 67.73% | 67.73% |
| Tomato Paste | 15.73% | 15.73% |
| Soybean Oil | 7.34% | 7.34% |
| Salt | 0.52% | 0.52% |
| Garlic | 0.44% | 0.44% |
| Basil | 0.24% | 0.24% |
| Pepper | 0.10% | 0.10% |
| Bay Leaf | 0.03% | 0.03% |
| Water | — | 3.15% |
| Sweet Whey Powder | — | 4.48% |
| Edlong Natural Parmesan Cheese Flavor No. 1085 | — | 0.24% |
| Enzyme-Modified, Lactose-Hydrolyzed Whole Whey | 7.87% | — |

EXAMPLE 5

This example illustrates: (1) the use of enzyme-modified, lactose-hydrolyzed whey as an ingredient for extending a product already having cheese flavor, (2) its use in a reduced calorie product, and (3) its ability to combine with and enhance the cheese flavor of a product which includes natural cheese. In particular, enzyme-modified, lactose-hydrolyzed whole whey, as described above, was used in combination with polydextrose, a non-caloric filler, to extend WISPRIDE, a cheese flavored spread manufactured by The Nestle Company, Inc., Hilbert, Wisconsin 54129. The formulations for the extended cheese spreads using enzyme-modified, lactose-hydrolyzed whole whey and a natural cheddar cheese flavor extract (Edlong Natural Cheddar Cheese Flavor No. 1032) are given in Table V. The products were prepared by mixing the extender ingredients with the WISPRIDE.

TABLE V
REDUCED CALORIE CHEESE SPREAD

| Ingredient | Enzyme-Modified Lactose-Hydrolyzed Whole Whey | Natural Cheese Flavor Extract |
|---|---|---|
| WISPRIDE Cold Pack Cheese Food | 66.67% | 66.67% |
| Polydextrose | 16.67% | 16.67% |
| Water | — | 6.66% |
| Sweet Whey Powder | — | 8.33% |
| Edlong Natural Cheddar Cheese Flavor No. 1032 | — | 1.67% |
| Enzyme-Modified, Lactose-Hydrolyzed Whole Whey (60% Solids) | 16.66% | — |

EXAMPLE 6

This example illustrates the level of cheese flavor obtained by partial replacement of natural blue cheese with blue cheese spice and the enzyme-modified, lactose-hydrolyzed whey fraction described above. The formulations of the products are given in Table VI. The products were prepared by blending the ingredients until smooth and creamy.

TABLE VI
BLUE CHEESE SALAD DRESSING

| Ingredient | Enzyme-Modified Lactose-Hydrolyzed Whole Whey | Natural Cheese |
|---|---|---|
| Dried Blue Cheese | 7.50% | 15.00% |
| Oil | 27.50% | 40.00% |
| Vinegar (5%) | 17.50% | 15.00% |
| Water | 16.00% | 10.00% |
| Sugar | 7.50% | 15.00% |
| Salt | 1.75% | 3.50% |
| Ground White Pepper | 0.25% | 0.50% |
| Xanthan Gum | 0.10% | 0.20% |
| Tragacanth Gum | 0.15% | 0.30% |
| Cascade Stabilizer | 1.00% | — |
| Staley Suragel Starch | 1.50% | — |
| Blue Cheese Spice | 0.50% | — |
| Enzyme-Modified, Lactose-Hydrolyzed Whole Whey (60% Solids) | 18.50% | — |

EXAMPLE 7

Expert taste panel tests were run on each pair of cheese flavored products prepared in accordance with Examples 1–6. The panel consisted of six judges selected on the basis of taste acuity. Samples were identified only by double digit random codes. The products were compared for cheese flavor and overall flavor. The panelists rated the products on a 9-point hedonic scale, with higher ratings indicating more cheese flavor or better overall flavor, respectively, for the two evaluations. The results are given in Table VII.

As can be seen from Table VII, for the cheese cracker and cheese spread products there was essentially no difference in cheese flavor between the products made with enzyme-modified, lactose-hydrolyzed whole whey and the products made with a commercial natural cheese flavor extract. For the cheese bread, pizza sauce and Italian sauce products, the samples using enzyme-modified, lactose-hydrolyzed whey were found to have as much or more cheese flavor than the samples using commercial cheese flavoring agents or natural cheese.

For the blue-cheese salad dressing product, a t-test analysis was performed on the cheese flavor data. The analysis showed that there was no significant difference in cheese flavor level between the product made completely from natural blue cheese and the product in which 50 percent of the blue cheese was replaced with enzyme-modified, lactose-hydrolyzed whole whey. Although the product with only natural blue cheese was found to have a significantly higher overall flavor rating, when the products were rated for overall quality as opposed to overall flavor, the product which included enzyme-modified, lactose-hydrolyzed whey was found to have a rating of 4.5 on a 9-point scale as compared to 1.3 for the product containing only natural blue cheese, where higher ratings corresponded to higher overall quality. This difference was found to be significant at the 95% confidence level, showing that overall the whey-based product was superior to the product made completely from natural blue cheese.

In view of the low cost of the whey-derived cheese flavoring agents and enhancers in comparison to the cost of other cheese flavoring agents, such as natural cheese or natural cheese flavor extracts, these results show that enzyme-modified, lactose-hydrolyzed whey products can be used to obtain cheese flavor in a variety of food products at reduced costs.

Although specific embodiments of the invention have been described and illustrated, it is to be understood that modifications can be made without departing from the invention's spirit and scope. Thus, although the invention has been illustrated with reference to a specific set of cheese flavored products, it is equally applicable to other types of cheese flavored products. For example, enzyme-modified, lactose-hydrolyzed whey or whey fractions can be used to supply cheese flavor in a variety of snack foods. Similarly, although the invention has been illustrated with a particular set of lipase and protease enzymes, it can be practiced with other enzymes which will develop the requisite cheese flavor profile and intensity.

TABLE VII
TASTE PANEL RESULTS

| | Cheese Flavor | Overall Flavor |
|---|---|---|
| CHEESE CRACKERS (Ex. 1) | | |
| Enzyme-Modified, Lactose-Hydrolyzed Whole Whey | 2.7 | 2.7 |
| Natural Cheese Flavor Extract | 2.7 | 3.2 |
| CHEESE BREAD (Ex. 2) | | |
| Enzyme-Modified, Lactose-Hydrolyzed Whole Whey | 3.2 | 2.7 |
| Natural Cheese | 1.5 | 2.8 |
| PIZZA SAUCE (Ex. 3) | | |
| Enzyme-Modified, Lactose-Hydrolyzed Whole Whey | 3.3 | 4.8 |
| Natural Cheese Flavor Extract | 3.0 | 4.3 |
| ITALIAN SAUCE (Ex. 4) | | |
| Enzyme-Modified, Lactose-Hydrolyzed Whole Whey | 4.0 | 4.0 |
| Natural Cheese Flavor Extract | 3.2 | 3.8 |
| CHEESE SPREAD (Ex. 5) | | |
| Enzyme-Modified, Lactose-Hydrolyzed Whole Whey | 4.8 | 5.3 |
| Natural Cheese Flavor Extract | 5.0 | 5.5 |
| BLUE-CHEESE DRESSING (Ex. 6) | | |
| Enzyme-Modified, Lactose-Hydrolyzed Whole Whey, Blue Cheese Spice, Natural Blue Cheese | 4.3 | 4.2 |
| Natural Blue Cheese | 4.8 | 6.3 |

What is claimed is:

1. A cheese flavoring agent comprising hydrolyzed, enzymatically modified whole whey, said whole whey having had an initial lactose content of from about 2 percent to about 90 percent on a dry weight basis, said hydrozylate resulting from enzymatically modifying the whole whey with lipase, protease, or a combination of lipase and protease, and lactose hydrolyzing at least 30% of the initial lactose content.

2. The cheese flavoring agent of claim 1, in which the whey had a lactose content, before hydrolysis, of from about 20 to about 85 percent by weight.

3. The cheese flavoring agent of claim 1 in which the lactose is at least about 40 percent hydrolyzed.

4. The cheese flavoring agent of claim 1 in which the lactose is at least about 70 percent hydrolyzed.

5. The cheese flavoring agent of claim 1 in which the whey had a protein content, before enzyme modification, of from about 8 to about 60 percent by weight.

6. The cheese flavoring agent of claim 5 in which the whey had a lactose content, before hydrolysis, of from about 20 to about 85 percent by weight, which lactose is at least about 40 percent hydrolyzed.

7. The cheese flavoring agent of claim 6 in which the lactose is at least about 70 percent hydrolyzed.

8. The cheese flavoring agent of claim 1 wherein the whey or whey fraction is enzyme modified with calf lipase, kid-lamb lipase and fungal protease enzymes.

9. A method for producing a whole whey-base cheese flavoring agent or cheese flavor enhancer which comprises the steps of:
   (a) enzymatically modifying whole whey with a protease or a combination of lipase and protease so as to provide a cheese flavor; and
   (b) hydrolyzing at least about 30 percent of the lactose component of the whole whey, the whey having had, before enzyme modification and lactose hydrolysis, a protein content of from about 2 to about 90 percent on a dry weight basis and a lactose content of from about 5 to about 85 percent on a dry weight basis.

10. The method of claim 9 in which the whey had a lactose content, before hydrolysis, of from about 20 to about 85 percent by weight.

11. The method of claim 9 in which the lactose is at least about 40 percent hydrolyzed.

12. The method of claim 9 in which the lactose is at least about 70 percent hydrolyzed.

13. The method of claim 9 in which the whey had a protein content, before enzyme modification, of from about 8 to about 60 percent by weight.

14. The method of claim 13 in which the whey had a lactose content, before hydrolysis, of from about 20 to about 85 percent by weight, which lactose is at least about 40 percent hydrolyzed.

15. The method of claim 14 in which the lactose is at least about 70 percent hydrolyzed.

16. The method of claim 9 wherein the whey is enzyme modified with calf lipase, kid-lamb lipase and fungal protease enzymes.

17. A method for producing a whole whey-base cheese flavoring agent or cheese flavor enhancer which comprises the steps of:
   (a) hydrolyzing at least about 30 percent of the lactose component of whole whey, said whey having an initial protein content of from about 2 to about 90 percent on a dry weight basis and a lactose content of from about 5 to about 85 percent on a dry weight basis; and
   (b) subsequently enzymatically modifying said hydrolyzed whey with a protease or a combination of lipase and protease thereby providing a cheese flavoring agent.

* * * * *